US012204617B2

(12) United States Patent
Davis (10) Patent No.: US 12,204,617 B2
(45) Date of Patent: Jan. 21, 2025

(54) KEY FOBS AND MENU ACCESS LEVEL AUTHORIZATION FOR CONTROL PANELS VIA BLUETOOTH PAIRING WITH USER DEVICES (71) Applicant: Cattron North America, Inc., Warren, OH (US)

(72) Inventor: Brett Allen Davis, Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 528 days.

(21) Appl. No.: 17/707,700

(22) Filed: Mar. 29, 2022

(65) Prior Publication Data
US 2022/0327185 A1  Oct. 13, 2022

Related U.S. Application Data (60) Provisional application No. 63/171,913, filed on Apr. 7, 2021.

(51) Int. Cl.
*H04W 4/80* (2018.01)
*G06F 21/31* (2013.01)
(Continued)

(52) U.S. Cl.
CPC .............. *G06F 21/31* (2013.01); *H04W 4/80* (2018.02); *H04W 76/14* (2018.02); *B60R 25/23* (2013.01)

(58) Field of Classification Search
CPC ......... G06F 21/31; H04W 76/14; H04W 4/80; B60R 25/23
(Continued)

(56) References Cited

U.S. PATENT DOCUMENTS 7,707,428 B2 * 4/2010 Poth .................. F24F 11/46
713/184
10,984,120 B2 * 4/2021 Nair .................. H04W 12/08
(Continued)

FOREIGN PATENT DOCUMENTS

CN    109495872 A    3/2019
EP    3515035 A1     7/2019

OTHER PUBLICATIONS

Extended European Search Report for EP22166622.5 which claims priority to the instant application; dated Aug. 24, 2022; 7 pages.
(Continued)

*Primary Examiner* — April G Gonzales
(74) *Attorney, Agent, or Firm* — Harness, Dickey & Pierce, P.L.C.; Anthony G. Fussner (57) ABSTRACT The present disclosure generally relates to key fobs and menu access authorization for control panels via pairing with user devices. In exemplary embodiments, a method generally includes pairing a user device (e.g., smartphone, Bluetooth-enabled device, etc.) to a control panel (e.g., engine control panel, etc.) such that the user device is operable as or similar to a key fob for the control panel. After the initial pairing and entry of the user's menu access level PIN into the control panel, the control panel will thereafter automatically power up or wake up, pair with the user device, and grant menu access level rights based on the previously entered user's menu access level PIN when the user device is within range of the control panel and/or the user device manually connects with the control panel.

24 Claims, 3 Drawing Sheets (51) Int. Cl.
 *H04W 76/14* (2018.01)
 *B60R 25/23* (2013.01)
(58) Field of Classification Search
 USPC .......................................................... 455/100
 See application file for complete search history.

(56) References Cited

U.S. PATENT DOCUMENTS

| | | | | |
|---|---|---|---|---|
| 11,539,522 | B2* | 12/2022 | Mars | G06Q 30/04 |
| 11,546,728 | B2* | 1/2023 | Mars | G06Q 20/321 |
| 11,605,089 | B2* | 3/2023 | Malik | G07F 9/002 |
| 11,695,768 | B1* | 7/2023 | Ramanathan | H04W 12/084 |
| | | | | 726/7 |
| 11,706,300 | B2* | 7/2023 | Warrick | H04W 12/64 |
| | | | | 340/12.52 |
| 11,875,418 | B2* | 1/2024 | Ibrahim | G06Q 20/3224 |
| 2005/0120012 | A1* | 6/2005 | Poth | G05B 19/0428 |
| 2008/0183335 | A1* | 7/2008 | Poth | F24F 11/88 |
| | | | | 700/276 |
| 2009/0228712 | A1* | 9/2009 | Poth | G05B 19/0428 |
| | | | | 713/184 |
| 2017/0171178 | A1* | 6/2017 | Reynders | G06Q 20/145 |
| 2019/0347431 | A1* | 11/2019 | Nair | H04L 63/107 |
| 2021/0209614 | A1* | 7/2021 | Bakalis | G06Q 10/0833 |
| 2021/0377734 | A1 | 12/2021 | Nakada | |
| 2023/0275640 | A1* | 8/2023 | Pehlke | H04B 1/385 |
| | | | | 455/100 |

OTHER PUBLICATIONS

CANplus Cattron CP1000 User Manual, Feb. 2021, 46 pages.
CANplus Cattron CP1000 Datasheet, Feb. 2021, 1 page.
Canadian office action dated Jan. 3, 2024 for CA3155817 that claims priority to the instant application; 5 pages.

\* cited by examiner

KEY FOBS AND MENU ACCESS LEVEL AUTHORIZATION FOR CONTROL PANELS VIA BLUETOOTH PAIRING WITH USER DEVICES

CROSS-REFERENCE TO RELATED APPLICATION

This application claims the benefit of and priority to U.S. Provisional Patent Application Ser. No. 63/171,913 filed Apr. 7, 2021. The entire disclosure of this provisional patent application is incorporated herein by reference.

FIELD

The present disclosure generally relates to key fobs and menu access authorization for control panels via pairing with user devices.

BACKGROUND

This section provides background information related to the present disclosure which is not necessarily prior art.

An engine control panel may be used for controlling, monitoring, and providing protection for an electronically or mechanically governed engine. Engine control panels are commonly used across mobile equipment, oil & gas, agriculture, and equipment rental markets.

DRAWINGS

The drawings described herein are for illustrative purposes only of selected embodiments and not all possible implementations and are not intended to limit the scope of the present disclosure.

Corresponding reference numerals may indicate corresponding (but not necessarily identical) parts throughout the several views of the drawings.

DETAILED DESCRIPTION

Example embodiments will now be described more fully with reference to the accompanying drawings.

An engine control panel may be used for controlling, monitoring, and providing protection for electronically or mechanically governed engines. For example, an engine control panel may be configured with autostart, manual operations, and readouts of important sensors.

Conventionally, a physical key may be required to manually unlock an engine control panel for use. In which case, each user must then keep track of his/her physical key for manually unlocking the engine control panel. And, each team member that will individually use the engine control panel will also need to have his/her own physical key. Each time the engine control panel is manually unlocked with a physical key, the user may be required to manually enter his/her personal identification number (PIN) (e.g., a numeric passcode, alpha-numeric passcode, etc.) before the user is authorized and granted the corresponding menu access level rights based on the user's manually entered PIN.

After recognizing the above, exemplary embodiments of systems and methods were developed and/or are disclosed herein in which a user device (e.g., smartphone, tablet, other portable communication device, Bluetooth-enabled device, etc.) is paired to a control panel (e.g., engine control panel, etc.) such that the user device is operable as or similar to a key fob for the control panel. After the initial pairing and entry of the user's menu access level PIN into the control panel, the control panel will thereafter automatically power up, pair with the user device, and grant menu access level rights based on the previously entered user's menu access level PIN when the user device is within range of the control panel and/or the user device manually connects (e.g., through the user device Bluetooth setup screen, directly from an App on the user device, etc.) to the control panel, e.g., without requiring manual use of a physical key to unlock the control panel and without requiring manual reentry of the user's menu access level PIN.

In exemplary embodiments, a physical key to manually unlock a control panel is only needed during an initial pairing/bonding of the user device with the control panel. After the user device and the control panel are initially paired/bonded, the user device is operable similar to or as a key fob. In exemplary embodiments, the control panel may be configured to automatically power up or wake up and pair with the user device when the user device is within range of the control panel and/or the user device manually connects to the control panel (e.g., through the user device Bluetooth setup screen, directly from an App on the user device, etc.), without requiring manual use of a physical key to unlock the control panel. For example, when the user device is within range of the control panel and/or the user device manually connects to the control panel (e.g., through the user device Bluetooth setup screen, directly from an App on the user device, etc.), the control panel may be configured for automatically waking up from sleep in which the control panel display is off and the control panel is in low power mode without requiring manual use of a physical key to unlock the control panel.

When the control panel is initially paired with the user device, the user will manually enter his/her menu access level PIN into the control panel, e.g., via a touchscreen display and/or keypad of the control panel, etc. For example, the user may manually enter his/her PIN to authenticate the user's menu access level such that the user is provided with the corresponding menu access level rights (e.g., user menu access level rights, tech menu access level rights, admin menu access level rights, developer menu access level rights, etc.) based on the PIN.

Thereafter, the control panel will automatically power up or wake up and pair with the user device when the user device is within range of the control panel and/or the user device manually connects to the control panel (e.g., through the user device Bluetooth setup screen, directly from an App on the user device, etc.). The control panel will also automatically authorize and grant the corresponding menu access level rights based on the user's menu access level PIN, which was previously manually entered into the control panel when the user device was initially paired to the control panel.

The range may depend on the particular radio frequency (RF) capability of the user device(s) and control panel(s). For example, the range may correspond with and/or depend on the Bluetooth RF capability of the user's smartphone and engine control panel. In some exemplary embodiments, the range may be preset and fixed to a maximum distance or radius (e.g., 50 yards, 95 yards, etc.) around the control panel. In alternative embodiments, the range around the control panel may also be selectively increased or decreased.

Accordingly, exemplary embodiments disclosed herein may therefore eliminate the need to manually use a physical key to unlock a control panel each and every subsequent time the control panel is going to be used by the user. Exemplary embodiments disclosed herein may also eliminate the need for the user to manually enter the user's menu access level PIN into the control panel each and every subsequent time the control panel is going to be used by the user.

Figure 1:
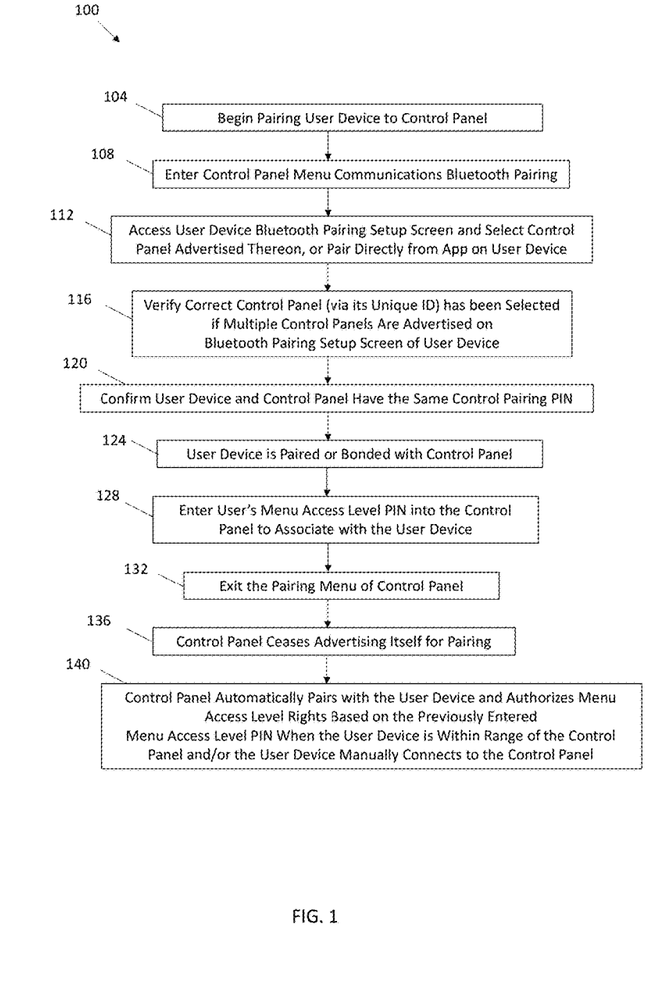
FIG. 1 illustrates a flowchart of an exemplary method in which a user device (e.g., smartphone, Bluetooth-enabled device, etc.) is paired to a control panel (e.g., engine control panel, etc.) such that the user device is operable as or similar to a key fob for the control panel according to exemplary embodiments of the disclosure.

With reference now to the figures, FIG. 1 illustrates an exemplary method 100 in which a user device (e.g., smartphone, Bluetooth-enabled device, etc.) is paired to a control panel (e.g., engine control panel, etc.) such that the user device is operable as or similar to a key fob with automatic authorization of user menu access level rights according to an exemplary embodiment of the disclosure. As shown in FIG. 1, the method 100 begins at 104 at which the user begins pairing the user device to the control panel. At 108, the user accesses or enters the control panel menu communications Bluetooth pairing.

Figure 2:
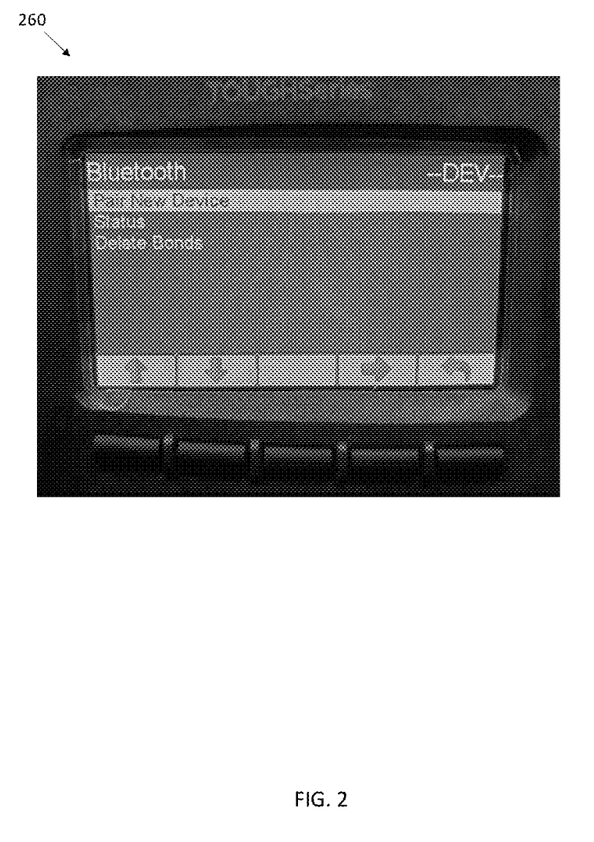
FIG. 2 illustrates an exemplary Bluetooth Pairing Menu on a display of a control panel according to an exemplary embodiment of the present disclosure.
Figure 3:
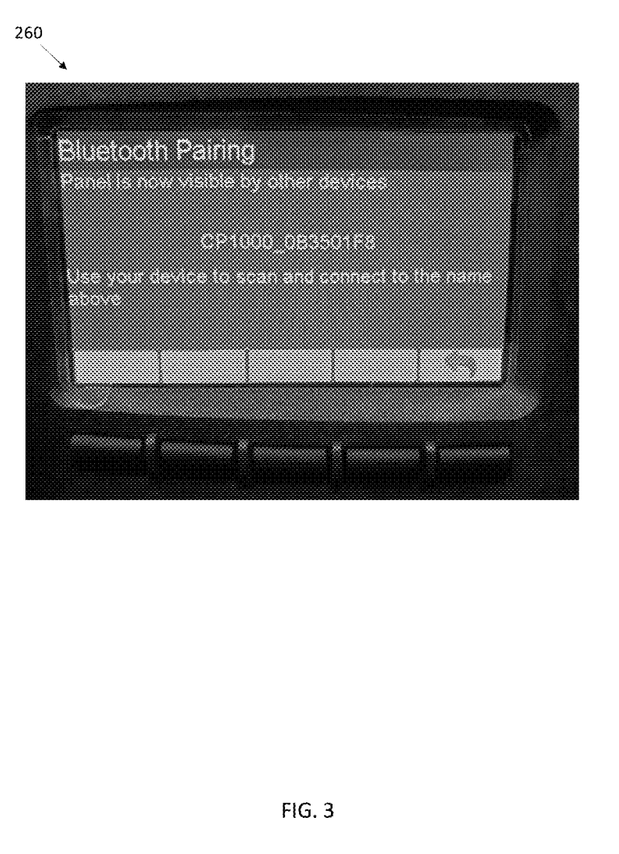
FIG. 3 illustrates the display of the control panel shown in FIG. 2 when the control panel is in Bluetooth Pairing mode and advertising that the control panel is now visible by other devices.

FIG. 2 illustrates an exemplary Bluetooth Pairing Menu on a display of a control panel 260. As shown in FIG. 2, the Bluetooth Pairing Menu includes the following user selectable options: Pair New Device, Status, and Delete Bonds. The user selectable options may be selected by using touchscreen buttons along the bottom of the display. In the top right corner of the display, the current access level is shown. In this case, the current access level is Developer (DEV), which may be the highest (most access) level. After the user selects Pair New Device option, then the display of the control panel 260 switches to displaying that the control panel is in Bluetooth Pairing mode and advertising that the control panel is visible by other devices as shown in FIG. 3. By way of example only, the control panel display may comprise a sunlight-viewable 4.3 inch diagonal WQVGA color display with five integrated backlit display buttons. Alternative embodiments may include or be used with control panels or devices having different displays and/or different user interfaces (e.g., pushbutton(s), joystick(s), touchscreen, etc.).

With continued reference to FIG. 1, the user at 112 accesses the Bluetooth pairing setup screen on the user device to select the control panel that is being advertised thereon, or pair directly from an App on user device. If there are multiple control panels advertised on the user device's Bluetooth pairing setup screen, the user should verify at 116 that the correct control panel and its unique ID (e.g., CP1000_0B3501F8 (FIG. 3), etc.) has been selected.

After the control panel has been selected, the user confirms at 120 that the user device and the control panel are both displaying the same pairing PIN for the control panel. This may include the user device requesting for a pairing PIN to be entered or confirmed, which pairing PIN is being displayed by the control panel. After the pairing PIN is confirmed at 120, then the user device is paired or bonded with the control panel at 124.

The control panel may then request entry of the user's menu access level PIN that is to be associated with the paired user device. At 128, the user enters his/her menu access level PIN via the control panel. The control panel will grant the menu access level rights corresponding to the user's menu access level PIN, e.g., user menu access level rights, tech menu access level rights, admin menu access level rights, developer menu access level rights, etc. By way of example only, pages 15-20 of Appendix A of U.S. Provisional Patent Application Ser. No. 63/171,913 include a menu tree of available menu items available for displaying by the control panel for a user dependent upon the current access level, i.e., user menu access level rights, tech menu access level rights, and admin menu access level rights. Some menus items are suppressed based on the access level currently allowed. In Appendix A, the color of the text in the menu tree indicates the minimum access level required for this particular item to be available for displaying. Appendix A is incorporated herein by reference.

At 132, the user exits the pairing menu of the control panel. After the user has exited the control panel's pairing menu, the control panel will stop advertising itself for pairing at 136, e.g., for security purposes and to make pairing easier, etc. When the user's device comes in range of the control panel and/or the user device manually connects to the control panel (e.g., through the user device Bluetooth setup screen, directly from an App on the user device, etc.), the control panel at 140 will automatically pair with this user device and authorize the menu access level rights based on the user's menu access level PIN, which was previously entered at 128.

The control panel may also be configured to allow a user to disassociate or unpair the user device from the control panel. For example, the user may be able to press and hold down a pushbutton switch, touchscreen button, etc. on the control panel for a predetermined amount of time (e.g., 10 seconds, more than 10 seconds, less than 10 seconds, etc.) to disassociate or unpair the user device from the control panel. The control panel may indicate to the user (e.g., via the control panel display, audio message, etc.) when the user device has been disassociated and unpaired from the control panel.

In exemplary embodiments disclosed herein, the control panel (e.g., an engine control panel, etc.) is configured to be paired/bonded with a user device via Bluetooth Low Energy (BLE) short-range wireless communication protocol. In other exemplary embodiments, the control panel may be configured to be paired/bonded with the user device via a different wireless communication protocol other than Bluetooth Low Energy.

By way of example only, an exemplary embodiment may include a control panel having one or more features as disclosed in Appendix A of U.S. Provisional Patent Application Ser. No. 63/171,913, which is incorporated herein by reference. In such exemplary embodiment, the control panel is a manual and autostart platform for electronically governed diesel or natural gas engines. The control panel can also control mechanically governed diesel engines. Graphical quad-gauge pages are displayed on a 4.3 inch diagonal WQVGA LCD. SAE J1939 parameters reported by an ECU (Engine Control Unit) can be displayed, including, but not limited to the following: RPM, coolant temperature, oil pressure, engine hours, voltage, exhaust emissions system state and diagnostic codes. The backlit display is clearly readable in both bright sunlight and total darkness and is housed in a rugged IP66 rated housing. The control panel includes three bright LEDs to indicate Faults and Warnings, Emission-Related Alerts and Autostart active. The control panel has five display keys that are associated with the dynamic Display Key bar as well as eight control buttons. The control panel features advanced automatic start/stop control and offers start/stop modes using an Event Manager, which can start or stop based on any of eight digital inputs, six 4-20 mA analog transducer inputs, Real Time Clock, or combinations of date/time and analog or digital inputs. With the use of a transducer, the control panel has a "cruise control" feature that automatically throttles the engine to maintain a configurable level. The control panel can be configured to use any one of the transducer inputs for the maintain/cruise control feature, regardless of whether that input is also being used as a start or stop event. The components of the control panel are installed in a heavy-duty, vibration-isolated metal or NEMA (National Electrical Manufacturer Association) rated plastic enclosure designed to withstand extreme industrial applications. External weather-resistant switches and controls facilitate convenient operator inputs/controls. Active fault conditions are displayable in plain language on popup messages and can be viewed in the fault list. Various diagnostic screens allow detailed investigation of the CAN bus data stream. All diagnostic and emissions-related messages displayed on the control panel are generated by the engine ECU or other attached devices.

In exemplary embodiments, a method comprises initially pairing a user device with a control panel and entering a menu access level personal identification number (PIN) into the control panel. After the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel.

In exemplary embodiments, pairing the user device with the control panel comprises pairing the user device with the control panel via Bluetooth short-range wireless communication protocol and/or via Bluetooth Low Energy short-range wireless communication protocol. After the initial pairing of the user device with the control panel and entry of the menu access level PIN into the control panel, the method may include using the user device as a Bluetooth key fob for the control panel.

In exemplary embodiments, the user device comprises a smartphone, and the control panel comprises an engine control panel. In such exemplary embodiments, pairing the user device with the control panel may comprise pairing the smartphone with the engine control panel via Bluetooth short-range wireless communication protocol. After the initial pairing of the user device with the control panel and entry of the menu access level PIN into the control panel, the method may include using the smartphone as a Bluetooth key fob for the engine control panel.

In exemplary embodiments, the control panel comprises an engine control panel configured to be operable for controlling, monitoring, and providing protection for an electronically or mechanically governed engine. The engine control panel is configured with autostart, manual operations, and readouts of important sensors.

In exemplary embodiments, after the initial pairing of the user device with the control panel and entry of the menu access level PIN into the control panel, the control panel automatically powers up or wakes up, pairs with user device, and grants menu access level rights based on the previously entered menu access level PIN when the user device is within range of the control panel and/or the user device manually connects to the control panel, without requiring manual use of a physical key to unlock the control panel and without requiring manual reentry of the menu access level PIN. In such exemplary embodiments, the method may include manually using a physical key to unlock the control panel before the initial pairing of the user device with the control panel and entry of the menu access level PIN into the control panel.

In exemplary embodiments, the method includes automatically powering up the control panel when the user device is within range of the control panel.

In exemplary embodiments, the method includes automatically powering up the control panel when the user device manually connects to the control panel.

In exemplary embodiments, the method includes automatically waking up the control panel from sleep in which a display of the control panel is off and the control panel is in a low power mode when the user device is within range of the control panel.

In exemplary embodiments, the method includes automatically waking up the control panel from sleep in which a display of the control panel is off and the control panel is in a low power mode when the user device manually connects to the control panel.

In exemplary embodiments, the method includes automatically pairing the control panel with the user device and granting menu access level rights based on the previously entered menu access level PIN when the user device is within a Bluetooth radio frequency range of the control panel.

In exemplary embodiments, the method includes automatically granting user menu access level rights, tech menu access level rights, or admin menu access level rights based on the previously entered menu access level PIN when the user device is within range of the control panel and/or the user device manually connects to the control panel.

In exemplary embodiments, the method includes: if multiple control panels are available for pairing with the user device, selecting a control panel from the available multiple control panels and verifying that the selection of the control panel is correct; and confirming that the selected control panel and the user device are displaying a same pairing PIN for the selected control panel.

In exemplary embodiments, a control panel comprises a wireless interface configured to allow the control panel to pair with a user device. The control panel also comprises a user interface configured to allow a user to enter a menu access level personal identification number (PIN) into the control panel. After the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel.

In exemplary embodiments, the control panel is configured to pair with the user device via Bluetooth short-range wireless communication protocol and/or via Bluetooth Low Energy short-range wireless communication protocol. In such exemplary embodiments, after the initial pairing of the user device with the control panel and entry of the menu access level PIN into the control panel, the control panel is configured such that the user device is usable as a Bluetooth key fob for the control panel.

In exemplary embodiments, the user device comprises a smartphone; and the control panel comprises an engine control panel.

In exemplary embodiments, the control panel comprises an engine control panel configured to be operable for controlling, monitoring, and providing protection for an electronically or mechanically governed engine. The engine control panel is configured with autostart, manual operations, and readouts of important sensors.

In exemplary embodiments, after the initial pairing of the user device with the control panel and entry of the menu access level PIN into the control panel, the control panel is configured to automatically power up or wake up, pair with user device, and grant menu access level rights based on the previously entered menu access level PIN when the user device is within range of the control panel and/or the user device manually connects to the control panel, without requiring manual use of a physical key to unlock the control panel and without requiring manual reentry of the menu access level PIN.

In exemplary embodiments, the control panel is configured such that a physical key is required to manually unlock the control panel before the initial pairing of the user device with the control panel and entry of the menu access level PIN into the control panel.

In exemplary embodiments, the control panel is configured to automatically power up when the user device is within range of the control panel.

In exemplary embodiments, the control panel is configured to automatically power up when the user device manually connects to the control panel.

In exemplary embodiments, the control panel is configured to automatically wake up from sleep in which a display of the control panel is off and the control panel is in a low power mode when the user device is within range of the control panel.

In exemplary embodiments, the control panel is configured to automatically wake up from sleep in which a display of the control panel is off and the control panel is in a low power mode when the user device manually connects to the control panel.

In exemplary embodiments, the control panel is configured to automatically pair with the user device and grant menu access level rights based on the previously entered menu access level PIN when the user device is within a Bluetooth radio frequency range of the control panel.

In exemplary embodiments, the control panel is configured to automatically grant user menu access level rights, tech menu access level rights, or admin menu access level rights based on the previously entered menu access level PIN when the user device is within range of the control panel and/or the user device manually connects to the control panel.

In exemplary embodiments, a system comprises a smartphone and a control panel as disclosed herein. The control panel is configured to pair with the smartphone. After the initial pairing of the smartphone with the control panel and entry of the menu access level PIN into the control panel, the control panel is configured to automatically pair with the smartphone and grant menu access level rights based on the previously entered menu access level PIN when the smartphone is within range of the control panel and/or the smartphone manually connects to the control panel. In such exemplary embodiments, the system may include an electronically or mechanically governed engine. The control panel may comprise an engine control panel configured to be operable for controlling, monitoring, and providing protection for the electronically or mechanically governed engine. The engine control panel may be configured with autostart, manual operations, and readouts of important sensors.

In exemplary embodiments, a system comprises a control panel as disclosed herein and an electronically or mechanically governed engine. The control panel may comprise an engine control panel configured to be operable for controlling, monitoring, and providing protection for the electronically or mechanically governed engine. The engine control panel may be configured with autostart, manual operations, and readouts of important sensors.

Aspects of the present disclosure should not be limited to only Bluetooth Low Energy (BLE) as other exemplary embodiments disclosed herein may include or be configured for use with other wireless communication protocols associated with other user devices (e.g., smartphones, tablets, other portable electronic devices, etc.). In addition, aspects of the present disclosure should also not be limited to use with any one specific type of control panel for a specific type of industrial application. Exemplary embodiments disclosed herein may be configured for use with control panels for engines and industrial machines with a variety of sizes to accommodate different applications (e.g., de-watering, irrigation, forestry, construction, power generation, off-highway applications, etc.) and/or different markets (e.g., agriculture, engines, motors & generators, equipment rental operators, mobile equipment, municipal, oil & gas, rail, etc.). For example, aspects of the present disclosure may be used with on-highway mobile equipment (e.g., vacuum Trucks, loader cranes, specialty trucks, concrete pumps, pressure washing trucks, etc.), off-highway mobile equipment (e.g., light towers, fire pumps, generators, dewatering pumps, terrain cranes, crawler cranes, rock breakers, screen machines, etc.), general equipment rental (e.g., construction equipment, concrete pumps, cranes, etc.), specialty equipment rental (e.g., pumps, tanks, power generation, HVAC, heat, etc.), extraction and fracking (e.g., generators, light towers, tanks, etc.), water transport (e.g., dewatering, bypass, gas transport, etc.), crop monitoring (e.g., frost protection, etc.), irrigation (e.g., irrigation pumps, lead monitoring, etc.), etc.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected, or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein:
pairing the user device with the control panel comprises pairing the user device with the control panel via Bluetooth short-range wireless communication protocol and/or via Bluetooth Low Energy short-range wireless communication protocol; and
after the initial pairing of the user device with the control panel and entry of the menu access level PIN into the control panel, the method includes using the user device as a Bluetooth key fob for the control panel.

2. The method of claim 1, wherein:
the control panel comprises an engine control panel configured to be operable for controlling, monitoring, and providing protection for an electronically or mechanically governed engine; and
the engine control panel is configured with autostart, manual operations, and readouts of important sensors.

3. The method of claim 1, wherein the method includes automatically pairing the control panel with the user device and granting menu access level rights based on the previously entered menu access level PIN when the user device is within a Bluetooth radio frequency range of the control panel.

4. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein:

the user device comprises a smartphone;
the control panel comprises an engine control panel;
pairing the user device with the control panel comprises pairing the smartphone with the engine control panel via Bluetooth short-range wireless communication protocol; and
after the initial pairing of the user device with the control panel and entry of the menu access level PIN into the control panel, the method includes using the smartphone as a Bluetooth key fob for the engine control panel.

5. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and whereinafter the initial pairing of the user device with the control panel and entry of the menu access level PIN into the control panel, the control panel automatically powers up or wakes up, pairs with user device, and grants menu access level rights based on the previously entered menu access level PIN when the user device is within range of the control panel and/or the user device manually connects to the control panel, without requiring manual use of a physical key to unlock the control panel and without requiring manual reentry of the menu access level PIN.

6. The method of claim 5, wherein the method includes manually using a physical key to unlock the control panel before the initial pairing of the user device with the control panel and entry of the menu access level PIN into the control panel.

7. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein the method includes:
  automatically powering up the control panel when the user device is within range of the control panel; or
  automatically waking up the control panel from sleep in which a display of the control panel is off and the control panel is in a low power mode when the user device is within range of the control panel.

8. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein the method includes:
  automatically powering up the control panel when the user device manually connects to the control panel; or
  automatically waking up the control panel from sleep in which a display of the control panel is off and the control panel is in a low power mode when the user device manually connects to the control panel.

9. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein the method includes automatically granting user menu access level rights, tech menu access level rights, or admin menu access level rights based on the previously entered menu access level PIN when the user device is within range of the control panel and/or the user device manually connects to the control panel.

10. The method of claim 9, wherein:
pairing the user device with the control panel comprises
  pairing the user device with the control panel via Bluetooth short-range wireless communication protocol; and/or
  pairing the user device with the control panel via Bluetooth Low Energy short-range wireless communication protocol.

11. The method of claim 10, whereinafter the initial pairing of the user device with the control panel and entry of the menu access level PIN into the control panel, the method includes using the user device as a Bluetooth key fob for the control panel.

12. A method comprising initially pairing a user device with a control panel and entering a menu access level personal identification number (PIN) into the control panel, whereinafter the initial pairing of the user device with the control panel and entry of the menu access level PIN into the control panel, the method comprises automatically pairing the control panel with the user device and granting menu access level rights based on the previously entered menu access level PIN when the user device is within range of the control panel and/or the user device manually connects to the control panel, and wherein the method includes:
  if multiple control panels are available for pairing with the user device, selecting a control panel from the available multiple control panels and verifying that the selection of the control panel is correct; and
  confirming that the selected control panel and the user device are displaying a same pairing PIN for the selected control panel.

13. A control panel comprising:
a wireless interface configured to allow the control panel to pair with a user device; and
a user interface configured to allow a user to enter a menu access level personal identification number (PIN) into the control panel;
whereinafter the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel, and
wherein:
  the control panel is configured to pair with the user device via Bluetooth short-range wireless communication protocol and/or via Bluetooth Low Energy short-range wireless communication protocol; and
  after the initial pairing of the user device with the control panel and entry of the menu access level PIN into the control panel, the control panel is configured such that the user device is usable as a Bluetooth key fob for the control panel.

14. The control panel of claim 13, wherein:
the user device comprises a smartphone; and
the control panel comprises an engine control panel.

15. The control panel of claim 13, wherein:
the control panel comprises an engine control panel configured to be operable for controlling, monitoring, and providing protection for an electronically or mechanically governed engine; and
the engine control panel is configured with autostart, manual operations, and readouts of important sensors.

16. The control panel of claim 13, wherein the control panel is configured to automatically pair with the user device and grant menu access level rights based on the previously entered menu access level PIN when the user device is within a Bluetooth radio frequency range of the control panel.

17. A system comprising a smartphone and the control panel of claim 13 configured to pair with the smartphone, whereinafter the initial pairing of the smartphone with the control panel and entry of the menu access level PIN into the control panel, the control panel is configured to automatically pair with the smartphone and grant menu access level rights based on the previously entered menu access level PIN when the smartphone is within range of the control panel and/or the smartphone manually connects to the control panel.

18. A control panel comprising:
a wireless interface configured to allow the control panel to pair with a user device; and
a user interface configured to allow a user to enter a menu access level personal identification number (PIN) into the control panel;
whereinafter the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel; and
whereinafter the initial pairing of the user device with the control panel and entry of the menu access level PIN into the control panel, the control panel is configured to automatically power up or wake up, pair with user device, and grant menu access level rights based on the previously entered menu access level PIN when the user device is within range of the control panel and/or the user device manually connects to the control panel, without requiring manual use of a physical key to unlock the control panel and without requiring manual reentry of the menu access level PIN.

19. The control panel of claim 18, wherein the control panel is configured such that a physical key is required to manually unlock the control panel before the initial pairing of the user device with the control panel and entry of the menu access level PIN into the control panel.

20. A control panel comprising:
a wireless interface configured to allow the control panel to pair with a user device; and
a user interface configured to allow a user to enter a menu access level personal identification number (PIN) into the control panel;
whereinafter the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel; and
wherein:
the control panel is configured to automatically power up when the user device is within range of the control panel; or
the control panel is configured to automatically wake up from sleep in which a display of the control panel is off and the control panel is in a low power mode when the user device is within range of the control panel.

21. A control panel comprising:
a wireless interface configured to allow the control panel to pair with a user device; and
a user interface configured to allow a user to enter a menu access level personal identification number (PIN) into the control panel;
whereinafter the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel; and
wherein:
the control panel is configured to automatically power up when the user device manually connects to the control panel; or
the control panel is configured to automatically wake up from sleep in which a display of the control panel is off and the control panel is in a low power mode when the user device manually connects to the control panel.

22. A control panel comprising:
a wireless interface configured to allow the control panel to pair with a user device; and
a user interface configured to allow a user to enter a menu access level personal identification number (PIN) into the control panel;
whereinafter the initial pairing of the user device with the control panel and entry of the menu access level PIN into the control panel, the control panel is configured to automatically pair with the user device and grant menu access level rights based on the previously entered menu access level PIN when the user device is within range of the control panel and/or the user device manually connects to the control panel; and
wherein the control panel is configured to automatically grant user menu access level rights, tech menu access level rights, or admin menu access level rights based on the previously entered menu access level PIN when the user device is within range of the control panel and/or the user device manually connects to the control panel.

23. The control panel of claim 22, wherein:
the control panel is configured to pair with the user device via Bluetooth short-range wireless communication protocol and/or via Bluetooth Low Energy short-range wireless communication protocol; and
after the initial pairing of the user device with the control panel and entry of the menu access level PIN into the control panel, the control panel is configured such that the user device is usable as a Bluetooth key fob for the control panel.

24. A system comprising a smartphone and a control panel configured to pair with the smartphone, the control panel including
a wireless interface configured to allow the control panel to pair with the smartphone; and
a user interface configured to allow a user to enter a menu access level personal identification number (PIN) into the control panel;
whereinafter the initial pairing of the smartphone with the control panel and entry of the menu access level PIN into the control panel, the control panel is configured to automatically pair with the smartphone and grant menu access level rights based on the previously entered menu access level PIN when the smartphone is within range of the control panel and/or the smartphone manually connects to the control panel; and
wherein:
  the system includes an electronically or mechanically governed engine;
  the control panel comprises an engine control panel configured to be operable for controlling, monitoring, and providing protection for the electronically or mechanically governed engine; and
  the engine control panel is configured with autostart, manual operations, and readouts of important sensors.

* * * * *